(12) United States Patent
Chen et al.

(10) Patent No.: US 8,380,928 B1
(45) Date of Patent: Feb. 19, 2013

(54) APPLYING DATA ACCESS ACTIVITY MEASUREMENTS

(75) Inventors: Xiangping Chen, Shrewsbury, MA (US); Khang Can, Framingham, MA (US); Manish Madhukar, Shrewsbury, MA (US); David W. Harvey, Newton Center, MA (US); Dean D. Throop, Efland, NC (US); Mark K. Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 472 days.

(21) Appl. No.: 12/640,292

(22) Filed: Dec. 17, 2009

(51) Int. Cl.
*G06F 12/08* (2006.01)

(52) U.S. Cl. .................. 711/117; 711/173; 718/104

(58) Field of Classification Search .................. None
See application file for complete search history.

(56) References Cited

U.S. PATENT DOCUMENTS

| 8,006,061 B1* | 8/2011 | Chatterjee et al. | 711/170 |
| 2006/0218366 A1* | 9/2006 | Fukuda et al. | 711/165 |
| 2011/0066767 A1* | 3/2011 | Hyde et al. | 710/18 |
| 2011/0106863 A1* | 5/2011 | Mamidi et al. | 707/823 |

* cited by examiner

*Primary Examiner* — Gary Portka
(74) *Attorney, Agent, or Firm* — Krishnendu Gupta; Jason A. Reyes

(57) ABSTRACT

A method is used in applying data access activity measurements. A slice relocation candidate list is generated which identifies slices to be relocated along with respective destination tier information. Slices in a pool are matched to respective matching tiers based on the slices' respective temperatures and tier preferences. Based on whether a current tier for a slice differs from the matching tier for the slice, the slice is listed in the relocation candidate list.

16 Claims, 2 Drawing Sheets

APPLYING DATA ACCESS ACTIVITY MEASUREMENTS

BACKGROUND

1. Technical Field

This application relates to applying data access activity measurements.

2. Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

SUMMARY OF THE INVENTION

A method is used in applying data access activity measurements. A slice relocation candidate list is generated which identifies slices to be relocated along with respective destination tier information. Slices in a pool are matched to respective matching tiers based on the slices' respective temperatures and tier preferences. Based on whether a current tier for a slice differs from the matching tier for the slice, the slice is listed in the relocation candidate list.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
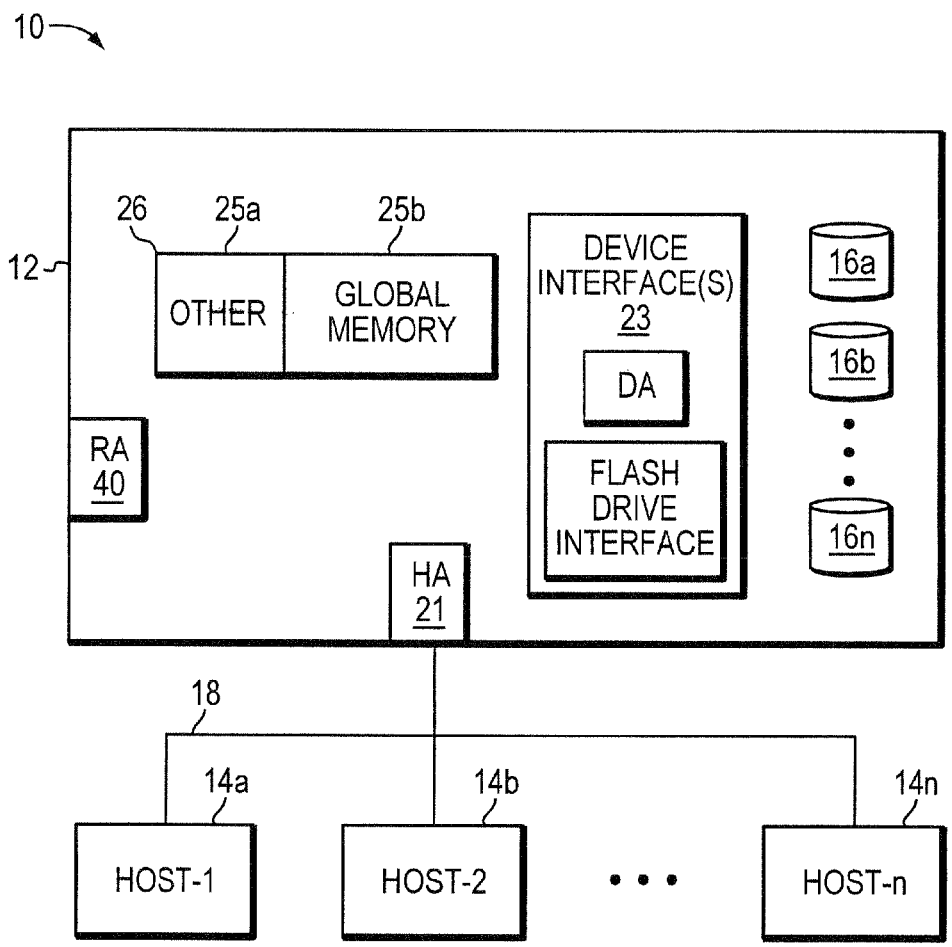
FIG. 1 is an example of an embodiment of a system that may utilize the technique described herein.

Large storage arrays today manage many disks which have historically been identical. However, it is possible to use different types of disks and group the like kinds of disks into tiers based on the performance characteristics of the disks. A group of fast but small disks may be a fast tier. A group of slow but large disks may be a slow tier. It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage pool ("pool") may be made up of different tiers, i.e., devices with different performance and cost characteristics. It may be advantageous to store the hot or most accessed data on the devices within the storage pool with the best performance characteristics while storing the cold or least accessed data on the devices that have slower performance characteristics. This can lead to a lower cost system having both faster and slower devices, that can emulate the performance of a more expensive system having only faster storage devices.

A technique described herein helps provide a way for the storage array to automatically apply results of differentiations of the hot data from the cold data. In at least one solution that includes the technique, a mixture of different types of disks in the storage array can have a performance profile more like an array of all fast disks with a cost profile approaching an array with slow disks without customers having to expend time to catagorize and manage tiers of storage. In at least one solution that includes the technique, data can be moved, or migrated, to the appropriate tier or devices within or between pools on a fine grain basis while using a rather limited set of resources to manage the tiering or devices in the pool.

Conventional approaches have either required the customer to only use a single kind of disk or for the customer to manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Conventional approaches required not only categorizing the data and manually placing the data on different tiers or pools, but also keeping the data classification up to date on an ongoing basis to react to changes in customer needs.

By contrast, in effect the technique described herein helps apply results of tracking the "temperature" of data, wherein "temperature" refers to a level of access activity for the data, e.g., how often and how recently the data has been accessed. Creating an automatic mechanism to decide which data to put on which tier or devices within a pool relies on distinguishing hot data from cold data. In general, "hot" data is data with a high level of access activity, e.g., data that has been accessed recently and/or often. In general, "cold" data is data with a low level of access activity, e.g., data that has not been accessed recently or often.

In at least one implementation as described below, the technique may be used to help provide a method of determining optimal data placement among storage tiers based on storage load, which method helps provide a way to determine respective preferable or best storage locations of data slices within a LUN in a storage pool, and to construct a slice relocation candidate list to move slices from their current locations to the respective preferable or best locations.

In at least some implementations, the technique makes use of slice load prediction, which is presented as slice temperature, and matches "hot" slices to one or more higher storage tiers and "cold" slices to one or more lower storage tiers, and also adjusts slice location based on LUN tier preference.

An array administrator can control how Logical Units are places in tiers by specifying controls that affect a decision for tier preference. Some Logical Units can be give a preference to always be on a slower tier. Other logical units can be give a preference to always be on a fast tiers. Yet other LUNs can be given a preference that they be distributed to best fit the slices to the tiers as indicated by the temperature. Other operator controls can be to specify the maximum amount of space any LUN can use on a specific tier. Yet other controls can specify that some LUNs are to be moved before other LUNs. Yet other controls can indicate the some LUNs should not be moved because they are fine as they are.

Conventionally, slices are allocated to LUNs in a storage pool as "best-fit" at initial allocation time. In at least some cases, since the I/O load pattern of a slice is not known at initial allocation time, conventionally the performance capability of slice storage allocated may be too high or too low for effective data access on a slice. Furthermore, a data access pattern tends to change over time. Older data is accessed less frequently and therefore in at least many cases does not require storage with higher performance capability. In absence of a mechanism to relocate slices to appropriate storage devices, when new storage devices are added to a storage pool, at least some of the benefits of added storage devices may not be utilized immediately.

In at least some implementations, the technique described herein may be used to help achieve one or more of the following: slice relocation candidate list generation by matching slices of different temperatures with respective tiers with different performance capabilities to achieve improved or optimal overall system performance; and slice relocation candidate list generation by matching slice tier preference and slice temperature with appropriate destinations to achieve user desired performance.

Data Storage System Terminology

With respect to the technique described herein, the following definitions may be particularly useful. A disk may be a physical disk within the storage system. A LUN may be a logical unit number which is an identifier for a Logical Unit. Each slice of data may have a mapping on the location of the physical drive where it starts and ends; a slice may be sliced again.

Data migration, i.e., the moving of data from one storage element to another, may be performed at the LUN level or the slice level. Data migration at the slice level may be performed by copying the data and then updating a map with the new location. With respect to the technique described herein, this may require adding temperature statistics to slices within pools. In addition to considering temperature distributions between tiers, slices may also be migrated within tiers to redistribute workload on disk This type of slice migration may apply to both LUNs. As well, cooler slices can be migrated to slower tier of storage.

Data Storage System

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Other configurations may used other storage arrays to physical storage for a storage array.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array and/or a CLARiiON® data storage array by EMC Corporation of Hopkinton, Mass. In the foregoing data storage array, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Thus, the storage system may be made up of physical devices with different physical and performance characteristics (e.g., types of physical devices, disk speed such as in RPMs), RAID levels and configurations, different replication services (such as particular software used in the data storage system providing data replication), allocation of cache, processors used to service an I/O request, and the like.

The dynamic aspects may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. A set of data storage resources, such as logical and/or physical devices, a portion of cache, and services, such as a software vendor's service for providing data replication, may be bound to, or designated for use by, consumers in a particular tier.

Conversely, the particular performance characteristics may be applied to a storage pool with or without the definition of tiers. That is, the system may group devices within a storage pool by their characteristics with or without explicitly creating a set of tiers and may instead develop a more hybrid method or creating a hierarchy based on the performance characteristic of the storage devices.

The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

Figure 2:
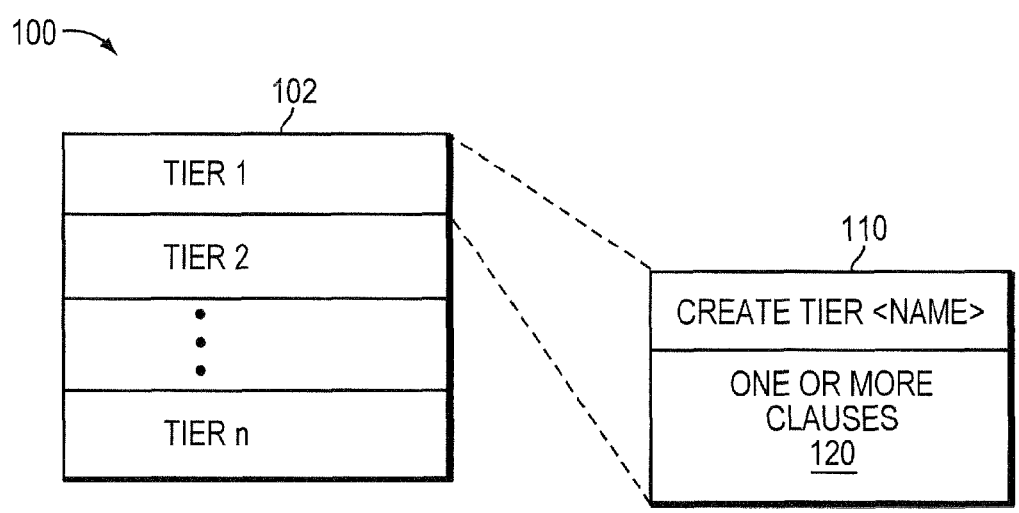
FIG. 2 is an embodiment of storage tiering that may be used with the technique described herein.

Referring to FIG. 2, shown is an example illustrating tiers. The example 100 includes a set of one or more tiers 102. Each tier, such as tier 1, may be creating by specifying a tier definition 110. In at least one embodiment, the tier definition 110 may include one or more lines of text in a language which may be subsequently processed by code on the data storage system. The tier definition 110 defines a tier indicated by <NAME>. The tier definition may include one or more clauses 120. The clauses of 120 may include one or more goal clauses and/or one or more configuration clauses.

Given that a storage system may be divided into tiers and that each tier can have different performance characteristics, the technique described herein helps enable management of data migration across the tiers. As described herein, the technique may facilitate migration of the hot data to the faster tiers and migration of the cold data to the slower tiers.

Current Technique

One of the goals of a storage system may be to increase the cost effectiveness of the storage system by using different types of storage such as a mix of SSD, FC, SATA; or may be only SSD and SATA devices. Data may be migrated across these devices to give good performance with improved cost and total cost of ownership (TCO). These devices may be partitioned into pools. The pools can be divided into slices, which represent a piece of the logical unit, which in turn represents a portion of the physical storage of the device. As well, groups of devices may belong to a storage tier based on its performance capabilities.

A goal in data storage may be to create a storage system, comprising storage devices of varied performance characteristics, that emulates a storage system comprising just the fastest performing devices. A way to implement this migration is through the use of temperature of data (hot data is used more often) to drive migration. In general, in accordance with the current techniques, hot data is migrated to faster (and typically more expensive) storage and cool data is migrated to slower (and typically less expensive) storage. Migrating the hottest, most accessed, data to fastest storage to give better performance for the user while migrating the coldest data to less expensive storage gives improved TCO for the user.

Use of the current techniques can help provide such a system by supporting migration or movement of the most used data to the quicker storage to improve user performance. The current techniques help enable this by making use of categorization of data as hot or cold and preparing, if possible, for migrating the hotter data to a tier with better performance data and for migrating the less used colder data to a slower tier. The current techniques also help enable this to be an automated migration occurring without user management. The temperature of data may be determined by analyzing how often that data is accessed. For example, the temperature may be given by a mapping corresponding to the number of times a particular slice of data was accessed in a given second or it may correspond to the response time of the accesses to the data or a combination of one or more of these attributes. Some implementations may choose to collect data only during time periods that are of particular interest; these maybe be setup by operator configuration or determined by host or storage system behavior. In addition, the temperature may, but need not, be further processed by taking the average of the calculated temperatures over a given period of time or may be calculated using exponential decay.

A storage pool may be a collection of disks, which may include disks of different types. Pools may subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices. A slice may be considered the smallest element that can be tracked and moved.

The technique described herein may help enable mapping and migration of slices. For example, slices may be moved from LUN to LUN.

Now described is relocation analysis in accordance with the technique.

An Auto-Tiering policy engine (PE) examines the pool's storage configuration and temperatures of all slices in that pool, and generates a slice relocation list. The slice relocation list identifies slices to be relocated with respective destination information.

Analysis Steps

The PE uses the following steps to generate a slice relocation candidate list which identifies slices to be relocated along with respective destination tier information. In general, slices in a pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list.

The steps work as follows:

1. Construct a list of all tiers. For each tier, obtain
   Number of free slices (slices available for data allocation)
   Number of slices that are being used.
   Capacity Limit, which is the maximum number of slices that can be put in this tier. In at least some implementations, Capacity Limit is smaller than tier useable capacity, since free space needs to be available for new slice allocation and slice relocation. Further details of Capacity Limit are provided below.
   Total Temperature Limit, which is the maximum total temperature of each tier. Further details of Total Temperature Limit are provided below. The Total Temperature Limit is used to help prevent overload of a tier, or to help load balancing among tiers.

2. Construct a list L of all slices in a storage pool. For each slice, obtain
   Slice temperature
   Operator input such as Tiering preference, Relocation-Off, preference for High-Tier, preference for Low-Tier, Optimal (no specific Auto-Tiering (AT) preference), or some specific maximum number of percentages of where a LUN can reside, or other operator controls. Slice Auto-Tiering preference is derived from the mapped LUN (MLU) tier properties to which the slice is allocated.

3. Filter out (remove) from list L all slices with Relocation-Off configuration. For each tier, Capacity Limit is decremented by the number of filtered out slices, and Total Temperature Limit is adjusted by subtracting the temperature of filtered out slices.

4. Split the List L into 3 lists based on auto-tiering preference:
   L1: list of slices with preference for High-Tier
   L2: list of slices with preference for Low-Tier
   L3: list of slices with no specific AT preference, which means the slice can be relocated freely to improve or optimize overall system performance.

5. Distribute slices from list L1 (High-Tier preference) to the tiers (note: in these steps, "distribute" and "fill" refer to matching slices to tiers, not yet actually moving slices). For each tier, starting with the highest tier, select the hottest slices from the list using a DivideSlices procedure described below, up to the tier's Limits, and fill up the tier. Adjust the tier's Limits by decrementing Capacity Limit by the number of slices filled in, and decrementing Tier Temperature Limit by the sum of the temperature of slices filled in ("Adjustment"). If there are any slices left when the tier is full (either Capacity Limit or Tier Temperature Limit reaches zero), go to next lower tier and repeat the process until L1 becomes empty.

6. Distribute slices from list L2 (Low-Tier preference) to the tiers. For each tier, starting with the lowest tier, select the coldest slices from the list, up to the tier's Limits, and fill in the tier. Adjust the tier Limits by performing Adjustment as described above. If there are any slices left in L2 when the tier is full, go to next higher tier and repeat the process until L2 becomes empty.

7. Distribute slices from list L3 (no AT preference) to the tiers. For each tier, starting with the highest tier, select the hottest slices from the list, up to the tier's Limits, and fill in the tier. Adjust the tier Limits by performing Adjustment as described above. If there are any slices left in L3 when the tier is full, go to next lower tier and repeat the process until L3 becomes empty.

8. Generate the Relocation Candidate List for each tier by checking every slice's respective current tier and matching tier. If the current tier of a slice is not the same as the matching tier, add the slice to the Relocation Candidate List.

9. Generate tier relocation analysis summary based on Relocation Candidate List.

Capacity Limit

In at least some cases, it is not desirable to fill all the slices of a storage tier with data, e.g., for one or more of the reasons below:

1. Filling all the slices of a storage tier could make relocation execution to this tier more difficult as it may be necessary to relocate some slices from this tier first before a slice can be relocated to this tier.

2. Filling all the slices of a storage tier could make initial placement of a slice with a tier preference more difficult and result in less than desired initial slice placement, which will result in slice relocation later on.

In at least one implementation, default Capacity Limit is set to be 90% of tier usable capacity. If total system capacity utilization is above the default Capacity Limit, the capacity limit of each tier is determined by average system capacity utilization.

Total Temperature Limit

Tier total temperature is the aggregate of all RAID group (RG) total temperature within the tier. Limiting the total temperature of a tier/RG can help prevent overload of a particular tier/RG, and can help achieve load balancing among tier/RG to at least some extent.

If an implementation uses I/O access rate or quotient of slice total response time to FLU average response time for slice temperature calculation, maximum total temperature of a RG can be derived from an RG IOPs performance estimation. Total Temperature Limit of an RG may be a fraction of RG IOPs performance estimation. For example, default Total Temperature Limit can be set to 80% of maximum total temperature. Similarly, if normalized slice total response time is used for slice temperature calculation, the total temperature limit of a RG can be derived from normalized product of RG IOPs estimation and RG average response time.

Total Temperature Limit of a tier is the sum of total temperature limits of all RGs within the tier.

DivideSlices Procedure
Pseudo-code
/*
*function DevideSlices( ): To divide a set of slices to two sub dataset with size and temperature limit, such that any item in high sub dataset have higher temperature than any item in low sub dataset.
*
*TotalSliceSet—a collection of Slices. Each slice has a slice temperature. The number of slices in this data set is equal to the combined number of space in the HighTierSet and the LowTierSet
*
*temperatureMin—the lowest temperature for an element in TotalSliceSet
*
*temperatureMax—the highest temperature for an element in TotalSliceSet
*
*HighTierSet—a finite sized container for the slices with highest temperatures, the max size of the set is bounded by the high tier capacity. The total temperature of all slices is bounded by tier total temperature limit.
*
*LowTierSet—a finite sized container for the slices with lower temperatures
*
**/

```
function DivideSlices ( TotalSliceSet, , temperatureMax,
HighTierSet, LowTierSet)
{
    if ( temperatureMin == temperatureMax ) {
    for each slice in TotalSliceSet
        if ( HighTierSet.full( ) != TRUE )
    Move slice from TotalSliceSet to HighTierSet;
    Decrement HighTierSet capacity limit;
    Decrement HighTierSet total temperature limit;
        else
            Move slice from TotalSliceSet to LowTierSet;
    Decrement LowTierSet capacity limit;
    Decrement LowTierSet total temperature limit;
    Function Exit;
}
    temperatureMid = (temperatureMin + temperatureMax)/2;
    tempHighTierSet = empty set;      //set up temporary HighTierSet
    tempLowTierSet = empty set;       //set up temporary LowTierSet
    for each slice in TotalSliceSet
        if ( slice.Temperature >= temperatureMid )
            Move slice from TotalSliceSet to tempHighTierSet;
        else
            Move slice from TotalSliceSet to tempLowTierSet;
        if ( tempHighTierSet.size( ) <= HighTierSet.availableCapacity( ) )
            Move all slices of tempHighTierSet to HighTierSet;
        If ( HighTierSet.full( ) )
            Function Exit;
        else
            DivideSlices ( temperatureMin, temperatureMid,
                                        tempLowTierSet, HighTierSet,
                                        LowTierSet);
    else
        move all slices of tempLowTierSet to LowTierSet;
    Decrement LowTierSet capacity limit;
    Decrement LowTierSet total temperature limit;
            DivideSlices ( temperatureMid, temperatureMax,
    tempHighTierSet, HighTierSet, LowTierSet);
}
```

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in applying data access activity measurements, the method comprising:
generating a slice relocation candidate list which identifies slices to be relocated along with respective destination tier information;
matching slices in a pool to respective matching tiers based on the slices' respective temperatures, tier preferences and the total temperature limit of the respective tiers, wherein the temperature refers to a level of access activity for the slice, the tier preference refers to an operator input and the total temperature limit of a tier is the sum of total temperature limits of all RAID groups within the tier, further wherein the total temperature limits of the RAID groups are a fraction of the maximum temperature limits of the RAID groups in order to prevent overload of the tiers; and
based on whether a current tier for a slice differs from the matching tier for the slice, listing the slice in the relocation candidate list.

2. The method of claim 1, wherein the relocation candidate list is generated by an auto-tiering policy engine.

3. The method of claim 1, wherein the relocation candidate list is based on how many slices are available for data allocation and how many slices are being used.

4. The method of claim 1, wherein the relocation candidate list is based on a maximum number of slices that can be put in the matching tier.

5. The method of claim 1, wherein the relocation candidate list is based on a preference derived from mapped LUN tier properties.

6. The method of claim 1, wherein the relocation candidate list is based on filtering out a slices with a no relocation configuration.

7. The method of claim 1, wherein the relocation candidate list is based on matching slices to tiers starting with the highest tier.

8. The method of claim 1, wherein the relocation candidate list is based on matching slices to higher tiers before lower tiers.

9. A system for use in applying data access activity measurements, the system comprising:
first logic generating a slice relocation candidate list which identifies slices to be relocated along with respective destination tier information;
second logic matching slices in a pool to respective matching tiers based on the slices' respective temperatures, tier preferences and the total temperature limit of the respective tiers, wherein the temperature refers to a level of access activity for the slice, the tier preference refers to an operator input and the total temperature limit of a tier is the sum of total temperature limits of all RAID groups within the tier, further wherein the total temperature limits of the RAID groups are a fraction of the maximum temperature limits of the RAID groups in order to prevent overload of the tiers; and
third logic listing, based on whether a current tier for a slice differs from the matching tier for the slice, the slice in the relocation candidate list.

10. The system of claim 9, wherein the relocation candidate list is generated by an auto-tiering policy engine.

11. The system of claim 9, wherein the relocation candidate list is based on how many slices are available for data allocation and how many slices are being used.

12. The system of claim 9, wherein the relocation candidate list is based on a maximum number of slices that can be put in the matching tier.

13. The system of claim 9, wherein the relocation candidate list is based on a preference derived from mapped LUN tier properties.

14. The system of claim 9, wherein the relocation candidate list is based on filtering out a slices with a no relocation configuration.

15. The system of claim 9, wherein the relocation candidate list is based on matching slices to tiers starting with the highest tier.

16. The system of claim 9, wherein the relocation candidate list is based on matching slices to higher tiers before lower tiers.

* * * * *